United States Patent [19]

Borgersen

[11] 4,412,455

[45] Nov. 1, 1983

[54] METHOD AND APPARATUS FOR MEASURING THE TORQUE OR POWER OF A BOAT MOTOR IN PLACE

[75] Inventor: Kjell I. Borgersen, Hjälteby, Sweden

[73] Assignee: AB Volvo, Gothenburg, Sweden

[21] Appl. No.: 309,115

[22] Filed: Oct. 6, 1981

[30] Foreign Application Priority Data

Oct. 6, 1980 [SE] Sweden ................................. 8006973

[51] Int. Cl.³ ................................................ G01L 3/16
[52] U.S. Cl. ................................................ 73/862.12
[58] Field of Search ........... 73/862.11, 862.12, 862.13, 73/862.14

[56] References Cited

U.S. PATENT DOCUMENTS 2,563,153  8/1951  Britt .
2,909,922 10/1959  Haman ............................. 73/862.12
3,969,931  7/1976  Lanning ....................... 73/862.14 X
4,109,519  8/1978  Bartlett et al. ............... 73/862.12 X Primary Examiner—James J. Gill
Assistant Examiner—Brian Tumm
Attorney, Agent, or Firm—Young & Thompson

[57] ABSTRACT

A process and a portable apparatus for performance testing of boat motors, especially with outboard drives. A brake disc is rotatably journalled in a hub of a supporting element which carries brake callipers and a lever arm, at the outer end of which a force-measuring instrument is arranged and is tensioned between the lever arm and a resistance in the form of an arm which can be clamped onto the cavitation plate of the drive. During performance testing of a boat motor, the propeller is removed and in its place the brake disc is non-rotatably mounted on the propeller shaft. The force-measuring instrument is connected to a display which gives directly the braked torque.

5 Claims, 1 Drawing Figure

U.S. Patent     Nov. 1, 1983     4,412,455
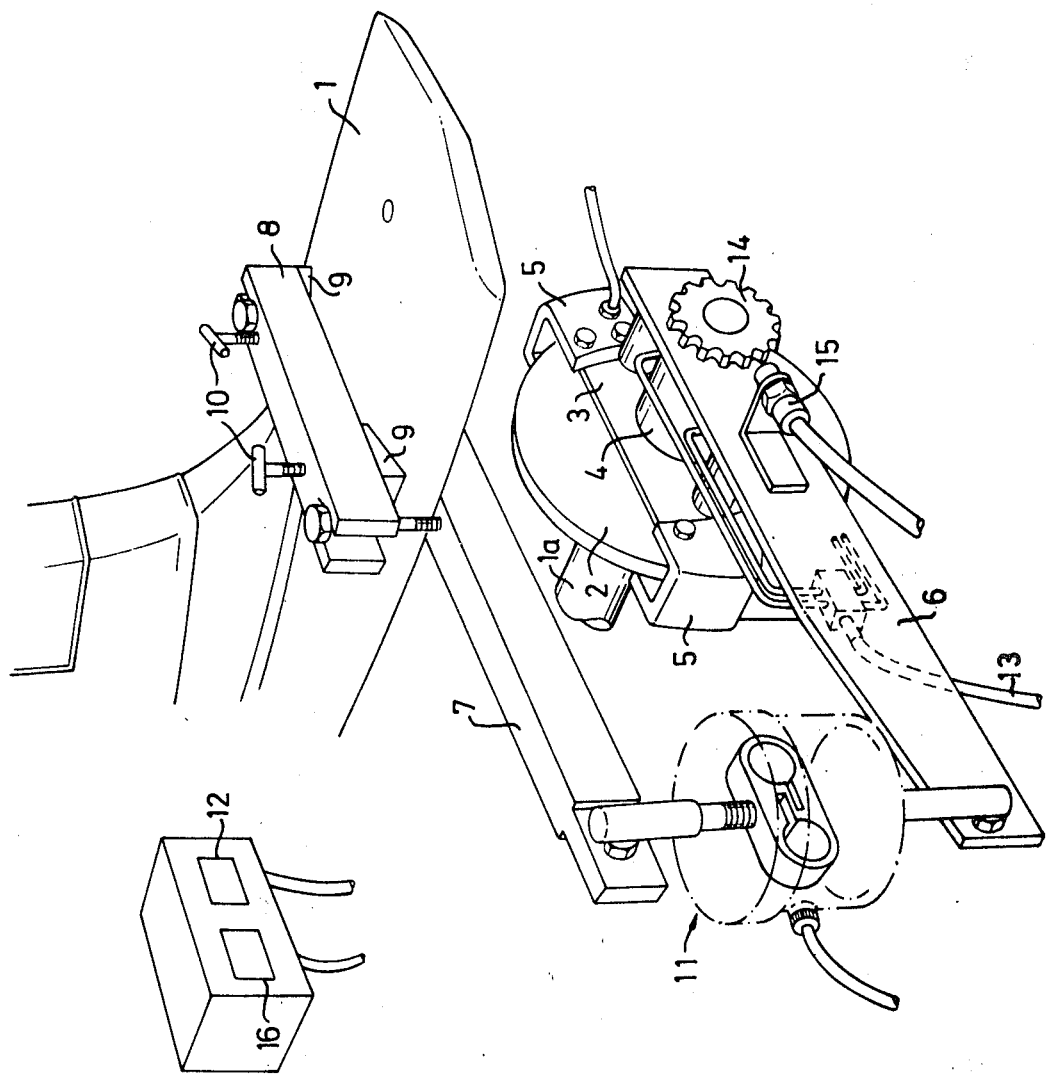

METHOD AND APPARATUS FOR MEASURING THE TORQUE OR POWER OF A BOAT MOTOR IN PLACE

The present invention relates to a process for measuring of at least the torque of a motor installation in a boat. The invention relates also to a portable apparatus for carrying out the process.

Devices known up to now for measuring motor torque or power in a boat motor are made as stationary apparatus with frames on which the motors are mounted for test operation. Consequently, this means that if a malfunction occurs or is suspected during an ongoing performance or functional test, the motor must be lifted out of the boat in order to check it in the brake bench. Since boat motors are often installed in closed, tight spaces, the labor involved in lifting and then reinstalling the motor is quite considerable. On top of this, there is the time it takes to transport the motor to and from the motor laboratory. It is easy to see that careful planning of the work involved in performance checking of boat motors is necessary, but despite this it is unavoidable that the boat will not be usable for a relatively long period.

The purpose of the present invention is to achieve a process and apparatus for performance testing of boat motors which eliminates the need for taking out the motor and makes it possible to measure the torque while the boat is in the water. The surrounding sea water or lake water absorbs heat generated and thus makes possible extended braking periods.

This is achieved according to the invention by a process which is characterized in that the propeller of the boat is removed; that a brake disc, exposed to the surroundings, with a supporting element which is rotatable relative to the brake disc and has braking means and force-actuated means, is mounted on the propeller shaft; and that a force-measuring instrument is mounted between, on the one hand, a member fixed in relation to the boat, and, on the other hand, said supporting element spaced from the axis of rotation of the supporting element, whereafter the motor is test-driven with the boat lying in the water while using the water as a cooling agent for cooling the brake disc.

An apparatus for carrying out this process will be particularly simple, since no special cooling arrangements are required. For performance testing of inboard/outboard motors, it is not even necessary to lift the boat out of the water to mount the apparatus. Rather, the propeller can be removed and a brake disc be mounted on the propeller shaft after tipping up the drive. In a preferred embodiment, one end of a force-measuring instrument is fixed to an arm which is clamped tightly on the cavitation plate of the drive.

The invention will be described in more detail with reference to an embodiment shown in the accompanying drawing.

The FIGURE shows a schematic perspective view of an apparatus for testing boat motors with outboard drives.

In the FIGURE, numeral 1 designates the cavitation plate on an outboard drive. A brake disc 2 is non-rotatably fixed on the propeller shaft 1a in the place of the propeller beneath the cavitation plate. The disc 2 is joined to a bushing (not shown) with internal splines which engage the external splines on the propeller shaft 1a. The bushing of the disc 2 is rotatably journalled in a hub 4 joined to a supporting element 3. The supporting element 3 carries a pair of braking callipers 5, which can be of the type used in disc brakes for automobiles, and comprising brake pads and hydraulic cylinders.

Via the hub 4, the supporting element 3 is rigidly joined to a lever arm 6. An additional arm 7 is clamped on the cavitation plate 1 with the aid of a bar 8 which is screwed tightly to the arm 7 and is provided with a pair of clamping blocks 9 with tensioning screws 10. A force-measuring instrument 11 such as a strain gauge is mounted between the outer ends of the arms 6 and 7 and is electrically connected to a display 12 of digital type, which gives directly the braked torque dependent on the braking force applied by the brake calliper 5. The brake calliper 5 is connected to a hydraulic line 13 which leads to a device (not shown) for setting the hydraulic pressure, e.g. a hydraulic pump or a hydraulic cylinder with a plunger which can be screwed in or out to vary the hydraulic pressure. The rotational speed is controlled with the aid of a rotation counter consisting of a toothed wheel 14 driven by the brake disc 2 and an inductive sensor 15 fixed on the arm 6, and which is electrically connected to a display instrument 16.

What I claim is:

1. A process for measuring at least the torque of a motor installation in a boat having a propeller carried by a propeller shaft, comprising removing the propeller from the propeller shaft, mounting on the propeller shaft a brake disc and a supporting element which is rotatable relative to the brake disc about the axis of the brake disc and that carries braking means and has force actuated means for applying the braking means to the brake disc, mounting a force measuring instrument between, on the one hand, a member fixed relative to the boat, and, on the other hand, said supporting element with said force measuring instrument spaced from the axis of rotation of the supporting element, test driving the motor with the boat lying in the water and the brake disc immersed in and in contact with the water, thereby using the water as a cooling agent for cooling the brake disc, and observing measurements of said force measuring instrument.

2. Portable apparatus for measuring of at least torque in a boat motor with a propeller shaft connected thereto, comprising a brake disc and means for establishing non-rotatable connection between the propeller shaft and the brake disc, a supporting element rotatably mounted relative to the brake disc for rotation about the axis of rotation of the brake disc, said supporting element carrying braking means and force-actuated means interacting with said braking means and by means of which the braking means can be pressed against the brake disc, and a force-measuring device which is fastened between, on the one hand, a member adapted to be securely fixed relative to a boat, and, on the other hand, said supporting element, at a distance from the axis of rotation of the supporting element, whereby in use the brake disc will be immersed in and in contact with the water, thereby using the water as a cooling agent for cooling the brake disc.

3. Apparatus according to claim 2, in which the brake disc is connected with means for registering the rotational speed of the brake disc.

4. Apparatus according to claim 2, in which the braking means and the force-actuated means are hydraulic brake callipers.

5. Apparatus according to claim 2, in which the force-measuring instrument is fixed between one end of a lever arm joined to the supporting element and one end of an arm which comprises said member and which is adapted to be joined to a cavitation plate of said boat.

* * * * *